US010291434B2

(12) United States Patent
Nguyen et al.

(10) Patent No.: US 10,291,434 B2
(45) Date of Patent: May 14, 2019

(54) MULTI-DESTINATION PACKET FORWARDING FOR A MULTI-HOMED DEVICE IN A VIRTUAL NETWORK

(71) Applicant: AVAGO TECHNOLOGIES INTERNATIONAL SALES PTE. LIMITED, Singapore (SG)

(72) Inventors: Lisa Hong Nguyen, San Jose, CA (US); Vijay Kumar Vasantha, San Jose, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 112 days.

(21) Appl. No.: 15/659,314

(22) Filed: Jul. 25, 2017

(65) Prior Publication Data

US 2018/0034665 A1 Feb. 1, 2018

Related U.S. Application Data

(60) Provisional application No. 62/420,464, filed on Nov. 10, 2016, provisional application No. 62/366,934, filed on Jul. 26, 2016.

(51) Int. Cl.
*H04L 12/46* (2006.01)
*H04L 12/741* (2013.01)
*H04W 8/00* (2009.01)
*H04W 8/30* (2009.01)

(52) U.S. Cl.
CPC .......... *H04L 12/4641* (2013.01); *H04L 45/74* (2013.01); *H04W 8/005* (2013.01); *H04W 8/30* (2013.01)

(58) Field of Classification Search
CPC .... H04L 12/4641; H04L 45/74; H04W 8/005; H04W 8/30
See application file for complete search history.

(56) References Cited

U.S. PATENT DOCUMENTS

2015/0271104 A1 9/2015 Shivalingayya
2017/0339052 A1* 11/2017 Arora .................... H04L 12/723

* cited by examiner

*Primary Examiner* — Ronald B Abelson
(74) *Attorney, Agent, or Firm* — Xsensus/Broadcom (57) ABSTRACT

One embodiment of the present invention provides a switch. The switch includes a network-virtualization module, an update module, an acknowledgment module, and an election module. During operation, the network-virtualization module establishes a forwarding segment for an end device multi-homed with the switch and a second switch. The forwarding segment can be identified by a segment identifier persistent in the switch and the second switch. The update module constructs, for the second switch, a first route update message comprising an indicator value for the forwarding segment. The acknowledgment determines the indictor value in a second route update message from the second switch as an acknowledgment for the first route update message. If the switch receives the acknowledgment from a respective switch participating in the forwarding segment, the election module initiates a designated forwarder election for the forwarding segment. The designated forwarder is responsible for forwarding multi-destination traffic in the forwarding segment.

20 Claims, 9 Drawing Sheets

MULTI-DESTINATION PACKET FORWARDING FOR A MULTI-HOMED DEVICE IN A VIRTUAL NETWORK

RELATED APPLICATIONS

This application claims the benefit of U.S. Provisional Application No. 62/366,934, entitled "EVPN Broadcast Unknown Unicast and Multicast (BUM) Packet Duplication Elimination," by inventors Lisa Hong Nguyen and Vijay Kumar Vasantha, filed 26 Jul. 2016; and U.S. Provisional Application No. 62/420,464, entitled "EVPN Broadcast Unknown Unicast and Multicast (BUM) Packet Duplication Elimination," by inventors Lisa Hong Nguyen and Vijay Kumar Vasantha, filed 10 Nov. 2016, the disclosures of which are incorporated by reference herein.

The present disclosure is related to U.S. patent application Ser. No. 12/730,749, titled "Method and System for Extending Routing Domain to Non-Routing End Stations," by inventors Pankaj K. Jha and Mitri Halabi, filed 24 Mar. 2010; and U.S. patent application Ser. No. 13/656,438, titled "VPLS Over Multi-Chassis Trunk," by inventors Srinivas Tatikonda, Rahul Vir, Eswara S. P. Chinthalapati, Vivek Agarwal, and Lok Yan Hui, filed 19 Oct. 2012, the disclosures of which are incorporated by reference herein.

BACKGROUND

Field

The present disclosure relates to a communication network. More specifically, the present disclosure relates to efficient multi-destination packet forwarding for a device in a virtual network.

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as multicasting, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

As more time-critical applications are being implemented in data communication networks, high-availability operation is becoming progressively more important as a value proposition for network architects. It is often desirable to establish a virtual network (e.g., a virtual private network (VPN)) to an end device. A virtual network can be established based on a typical virtual private local area network (LAN) service (VPLS) and virtual leased line (VLL). VPLS and VLL can provide a VPN between switches located in remote sites. For example, VPLS allows geographically distributed sites to share a layer-2 broadcast domain.

Individual switches (or provider edge (PE) nodes) in a local network are equipped to manage VPLS traffic but are constrained while operating in conjunction with each other for providing multi-homing to a customer edge (CE) node (e.g., an end device). Such a CE node can be multi-homed with multiple PE switches (e.g., via aggregated links to multiple switches to operate as a single logical link) to facilitate load balancing among the PE multiple switches while providing high availability.

While multi-homing brings many desirable features to a virtual network, some issues remain unsolved for forwarding multi-destination traffic.

SUMMARY

One embodiment of the present invention provides a switch. The switch includes a network-virtualization module, an update module, an acknowledgment module, and an election module. During operation, the network-virtualization module establishes a forwarding segment for an end device multi-homed with the switch and a second switch participating in the forwarding segment. The forwarding segment can be identified by a segment identifier persistent in the switch and the second switch. The update module constructs, for the second switch, a first route update message comprising an indicator value for the forwarding segment. The acknowledgment determines the indictor value in a second route update message from the second switch as an acknowledgment for the first route update message. If the switch receives the acknowledgment from a respective switch participating in the forwarding segment, the election module initiates a designated forwarder election for the forwarding segment. The designated forwarder is responsible for forwarding multi-destination traffic in the forwarding segment.

In a variation on this embodiment, the forwarding segment is an Ethernet segment of a virtual private network (VPN).

In a further variation on this embodiment, the switch and the second switch are provider edge (PE) nodes, and the end device is a customer edge (CE) node in the VPN.

In a variation on this embodiment, the indicator value is a value encoded in a transitive Extended Community field of the first and second route update messages.

In a variation on this embodiment, the election module elects a designated forwarder for a respective virtual local area network (VLAN) independently from the second switch.

In a variation on this embodiment, if the switch detects a failure associated with the second switch, the election module elects the switch as the designated forwarder for all VLANs for which the second switch has been elected as the designated forwarder prior to the failure.

In a further variation, the acknowledgment module determines the indictor value in a third route update message from the second switch indicating a recovery from the failure. The election module then elects the second switch as the designated forwarder for the first VLAN.

In a variation on this embodiment, during the initialization of the forwarding segment, the election module can wait for a predetermined period of time prior to electing the second switch as the designated forwarder for the first VLAN.

In a variation on this embodiment, the update module constructs the first route update message in response to one of: (i) initialization of the forwarding segment for the end device, and (ii) a recovery from a failure of the switch associated with the forwarding segment for the end device.

In a variation on this embodiment, the election module elects the switch as the designated forwarder for a second VLAN. The switch then also includes a packet processor, which discards a multi-destination packet belonging to the VLAN.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments described herein solve the problem of efficiently forwarding multi-destination packets by avoiding packet duplication in a virtual network during a failover (e.g., a failure and it's recovery, or a "flap") by electing a designated forwarder upon ensuring route update synchronization among the partner switches of a multi-homed end device. An end device is multi-homed when that end device is coupled to two or more switches via one or more links. These switches are referred to as partner switches.

In some embodiments, a multi-chassis trunk is established when the end device becomes coupled to the partner switches using a link aggregation group. The aggregated links operate as a single logical link to facilitate load balancing among the partner switches while providing redundancy. The partner switches can synchronize their configuration information with each other. Based on the synchronized information, partner switches can be configured to appear as a single logical switch to the end device. If the switches are capable of originating and terminating a logical connection (e.g., a virtual private LAN service (VPLS) instance) to facilitate a virtual network (e.g., a virtual private network or VPN), they can be referred to as provider edge (PE) nodes. The multi-homed end device can be referred to as a customer edge (CE) node. The network segment coupling the PE nodes to the multi-homed CE node can be referred to as a forwarding segment. For example, the forwarding segment can be a VPN Ethernet segment.

The PE nodes facilitating multi-homing to a CE node are referred to as partner PE nodes. A respective partner PE node (i.e., a partner switch operating as a PE node) forwards multi-destination packets to a multi-homed CE node based on a distribution policy. For example, for each virtual local area network (VLAN), one of the partner PE nodes is elected as a designated forwarder, which is responsible for forwarding multi-destination traffic, such as broadcast, unknown unicast, and multicast (BUM) traffic, to the CE node. Other PE nodes can discard multi-destination traffic for that VLAN. With existing technologies, upon discovering a new forwarding segment, a PE node advertises an updated route and initiates a timer for the other partner PE nodes to advertise their respective routes. When the timer expires, the PE node can run an election algorithm to determine a respective designated forwarder for a corresponding VLAN.

If the PE node operating as the designated forwarder encounters an event (e.g., a failure), a second PE node can start operating as the designated forwarder. However, when the PE node recovers from the event and initiates the designated forwarder election process before the second PE node converges, both PE nodes may act as the designated forwarder. As a result, multi-destination traffic, such as broadcast, unknown unicast, and multicast traffic, may be flooded from both PE nodes to the CE node, leading to packet duplication at the CE node.

To solve this problem, in embodiments of the present invention, if a PE node receives a route update (e.g., an Ethernet segment (ES) or an auto-discovery (AD) route update) from a partner PE node, the PE node sends an acknowledgment to the partner PE node. This route update can be a boarder gateway protocol (BGP) route update. A PE node can send a route update if a new forwarding segment is deployed or in response to a recovery event (e.g., a failover). In some embodiments, the PE node can include an indicator, such as a flag, in the route update. When a partner PE node receives the route update, based on the indicator, the partner PE node determines that the PE node has been recovered.

In response, the partner PE node sends its own route update with the indicator. When the PE node receives this route update, the indicator operates as a "piggy-backed" acknowledgment. Based on the acknowledgment, the PE node determines that a corresponding partner PE node has received the route updates. When the PE node receives an acknowledgment from a respective other partner PE node, the PE node initiates the designated forwarder election process. In this way, a respective PE node ensures that only one designated forwarder remains elected at a time, thereby avoiding duplication of multi-destination packets. In some embodiments, the indicator is a specific value encoded in a transitive Extended Community field of the route update (e.g., 0x80).

Although the instant disclosure is presented using examples based on VPLS, embodiments of the present invention are not limited to VPLS. Embodiments of the present invention are relevant to any method that facilitates a virtual private network. In this disclosure, the term "VPLS" is used in a generic sense, and can refer to any network interconnection virtualization technique implemented in any networking layer, sub-layer, or a combination of networking layers.

In this disclosure, the term "PE node" is used in a generic sense and can refer to any network device participating in a virtual private network. A PE node can refer to any networking device capable of establishing and maintaining a logical connection to another remote networking device. The term "logical connection" can refer to a virtual link which spans one or more physical links and appears as a single logical link between the end points of the logical connection. Examples of a logical connection include, but are not limited to, a VPLS pseudo-wire, and an MPLS or Generalized MPLS (GMPLS) connection.

In this disclosure, the term "end device" can refer to a host machine, a conventional switch, or any other type of networking device. An end device can be coupled to other switches or hosts further away from a network. An end device can also be an aggregation point for a number of switches to enter the network. The term "CE node" can refer to a host machine, a conventional switch, or any other type of networking device coupled to a PE node via one or more physical links. The terms "end device" and "CE node" are used interchangeably in this disclosure.

The term "packet" refers to a group of bits that can be transported together across a network. "Packet" should not be interpreted as limiting embodiments of the present invention to any networking layer. "Packet" can be replaced by other terminologies referring to a group of bits, such as "message," "frame," "cell," or "datagram."

The term "switch" is used in a generic sense, and it can refer to any standalone or fabric switch operating in any network layer. "Switch" should not be interpreted as limiting embodiments of the present invention to layer-2 networks. Any physical or virtual device (e.g., a virtual machine, which can be a virtual switch, operating on a computing device) that can forward traffic to an end device can be referred to as a "switch." Examples of a "network device" include, but not limited to, a layer-2 switch, a layer-3 router, or a TRILL RBridge. In this disclosure, the terms "switch" and "PE node" are used interchangeably. The same physical device can be referred to as a switch and a PE node.

The term "fabric switch" refers to a number of interconnected physical switches that form a single, scalable logical switch. In a fabric switch, any number of switches can be connected in an arbitrary topology, and the entire group of switches functions together as one single switch. This feature makes it possible to use many smaller, inexpensive switches to construct a large fabric switch, which can be viewed externally as a single switch. In some embodiments, a respective switch in the fabric switch is an Internet Protocol (IP) routing-capable switch (e.g., an IP router). In some further embodiments, a respective switch in the fabric switch is a Transparent Interconnection of Lots of Links (TRILL) routing bridge (RBridge).

It should be noted that a fabric switch is not the same as conventional switch stacking. In switch stacking, multiple switches are interconnected at a common location (often within the same rack), based on a particular topology, and manually configured in a particular way. These stacked switches typically share a common address, such as an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary physical topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can be represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identify the switch as a member switch of the fabric switch.

Network Architecture

Figure 1A:
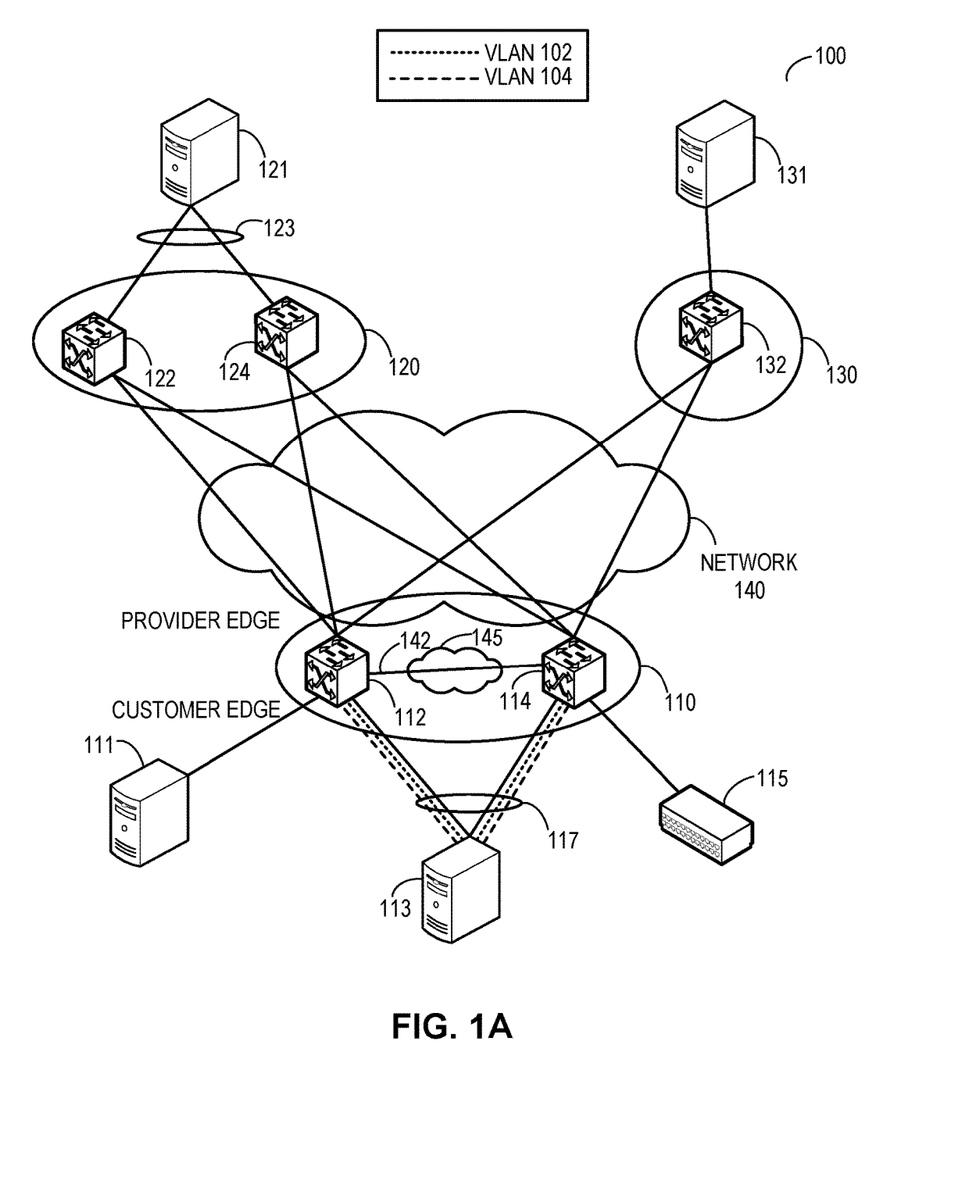
FIG. 1A illustrates an exemplary virtual private network facilitating efficient forwarding of multi-destination traffic to a multi-homed CE node, in accordance with an embodiment of the present invention.

FIG. 1A illustrates an exemplary virtual private network facilitating efficient forwarding of multi-destination traffic to a multi-homed CE node, in accordance with an embodiment of the present invention. As illustrated in FIG. 1A, an enterprise network 100 includes network sites 110, 120, and 130, interconnected via network 140. In some embodiments, network 140 is an MPLS network. Site 110 includes PE nodes 112 and 114. Multi-homed CE node 113 is coupled to partner PE nodes 112 and 114 via a forwarding segment 117. Forwarding segment 117 can be an Ethernet segment identified by an Ethernet segment identifier (ESI). Since forwarding segment 117 may logically aggregate the links between CE node 113, and PE nodes 112 and 114, forwarding segment 117 can also be referred to as a virtual link aggregation.

PE nodes 112 and 114 can be coupled to each other via one or more physical links 142. CE nodes 111 and 115 are coupled to PE nodes 112 and 114, respectively, via one or more physical links. In this example, CE node 115 can be a layer-2 switch. Site 120 includes CE node 121 coupled to PE nodes 122 and 124 via one or more physical links. Site 130 includes CE node 131 coupled to PE node 132 via one or more physical links. In some embodiments, partner PE nodes 112 and 114 have separate identifiers (e.g., Internet Protocol (IP) addresses), respectively. These identifiers individually identify partner PE nodes 112 and 114 in network 140.

During operation, PE nodes 112 and 114 recognize each other as partner PE nodes. A PE node can recognize a partner PE node from local information preconfigured by a network administrator. PE nodes 112 and 114 establish a point-to-point connection between them and synchronize configuration information. Configuration information can include, but is not limited to, a PE node identifier (e.g., an IP address), a virtual circuit label or a VC label, a virtual circuit mode, and the layer-2 forwarding table size. PE nodes 112 and 114 can store the configuration information in a local link-aggregation database (e.g., a table). In some embodiments, PE nodes 112 and 114 exchange notification messages to synchronize the configuration information. The payload of a notification message includes the configuration information, such as a VC label.

In some embodiments, PE node 112 constructs a control message requesting to establish a separate logical connection and sends the control message to partner PE node 114. In the same way, PE node 114 also creates a control message and sends the control message to partner PE node 112. By exchanging these control messages, PE nodes 112 and 114 create a separate logical connection 145 between themselves. Logical connection 145 can be an MPLS-based VPLS pseudo-wire. A logical connection between two partner PE nodes, such as logical connection 145, can be referred to as a spoke.

When PE nodes 112 and 114 initiate (e.g., at the startup), PE nodes 112 and 114 exchange routing information (e.g., VPN routes) with each other to determine forwarding segment reachability. Since PE nodes 112 and 114 are coupled to the same forwarding segment, which provides multi-homing to CE node 113, PE nodes 112 and 114 automatically discover each other. For example, PE nodes 112 and 114 can discover PE nodes of a given VPN instance. PE nodes 112 and 114 elect a designated forwarder responsible for forwarding multi-destination traffic for a respective VLAN. In some embodiments, a respective VLAN in the forwarding segment can be represented by a corresponding VPN instance. Suppose that VLANs 102 and 104 are configured for CE node 113. VLANs 102 and 104 can be represented by corresponding VPN instances in forwarding segment 117.

Typically, a PE node 112 (or PE node 114) forwards multi-destination packets to CE node 113 based on a distribution policy. For example, for each of VLANs 102 and 104, one of PE nodes 112 and 114 is elected as a designated forwarder, which is responsible for forwarding multi-destination traffic to CE node 113. For example, PE nodes 112 and 114 can be elected as the designated forwarder for VLANs 102 and 104, respectively. PE nodes 112 and 114 can discard multi-destination traffic for VLANs 104 and 102, respectively. Since the responsibility of forwarding multi-destination traffic in different VLANs is distributed between partner PE nodes 112 and 114, the traffic load is load balanced.

With existing technologies, if PE node 112 encounters an event (e.g., a failure), PE node 114 can start operating as the designated forwarder for VLAN 102. When PE node 112 recovers from the event, PE node 112 starts operating as the designated forwarder for VLAN 102 to ensure load balancing among the traffic of different VLANs. Typically, upon recovery, PE node 112 sends a local route update to PE node 114 and waits for a predetermined period of time (e.g., three seconds) before initiating the designated forwarder election process. However, PE node 114 may not receive or process the route update from PE node 112 within that period of time. As a result, after the period of time, when PE node 112 elects itself as the designated forwarder, PE node 114 can still operate as the designated forwarder. This can cause both PE nodes 112 and 114 to forward multi-destination traffic to CE node 113, leading to packet duplication at CE node 113. If the applications running on CE node 113 are not configured to handle packet duplication, the operation of the applications on CE node 113 can be jeopardized.

To solve this problem, in embodiments of the present invention, PE node 112 includes an indicator in the route update (e.g., an Extended Community value). When PE node 114 receives the route update from PE node 112, PE node 114 generates its route update, includes the indicator in the route update, and sends the route update to PE node 112. This indicator in the route update can be an acknowledgment for the route update from PE node 112. Based on the acknowledgment, PE node 112 determines that PE node 114 has received the route updates. When PE node 112 receives an acknowledgment from a respective other partner PE node (PE node 114 in FIG. 1A), PE node 112 initiates the designated forwarder election process. In this way, during the recovery process, PE node 112 ensures that only one designated forwarder remains elected at a time, thereby avoiding duplication of multi-destination packets.

In some embodiments, to elect the designated forwarder, PE node 112 can build a sorted list of the IP addresses of PE nodes 112 and 114. Each of PE nodes 112 and 114 can be assigned an ordinal number. For example, since there are two partner PE nodes, the ordinal numbers for PE nodes 112 and 114 can be 1 and 2, respectively. During the election process, each of PE nodes 112 and 114 individually determines the designated forwarder based on the same calculation for a respective VLAN. For example, PE node 112 can determine whether its ordinal number equals a modulus operation using the VLAN identifier of VLAN 102 and the number of PE nodes (e.g., 2 for forwarding segment 117). For example, the operation can be (V mod N), where V is the VLAN identifier of VLAN 102 and N is the number of PE nodes in forwarding segment 117.

If the modulus operation matches the value of 1, PE node 112 determines itself to be the designated forwarder of multi-destination traffic for VLAN 102. Since PE node 114 performs the same calculation, PE node 114 also determines that PE node 112 is the designated forwarder of multi-destination traffic for VLAN 102. To ensure that PE nodes 112 and 114 calculate the designated forwarder for the same forwarding segment, PE nodes 112 and 114 use a forwarding segment identifier to identify forwarding segment 117. For example, the forwarding segment identifier can be an Ethernet segment identifier, which is a globally unique label for each Ethernet segment.

Figure 1B:
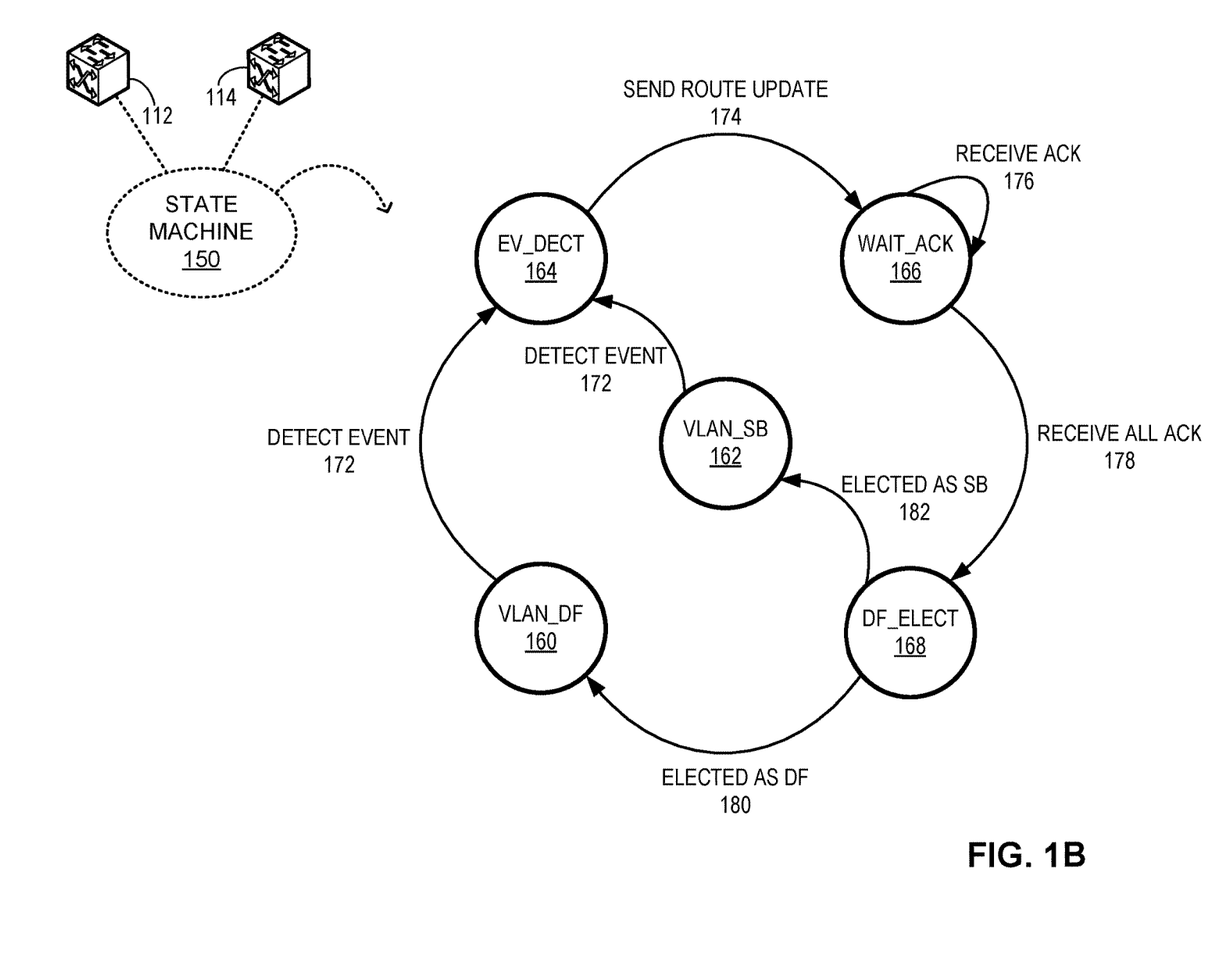
FIG. 1B illustrates an exemplary state diagram of efficient forwarding of multi-destination traffic to a multi-homed end device in a virtual private network, in accordance with an embodiment of the present invention.

FIG. 1B illustrates an exemplary state diagram of efficient forwarding of multi-destination traffic to a multi-homed end device in a virtual private network, in accordance with an embodiment of the present invention. PE nodes 112 and 114 can maintain a state machine 150 to determine how to elect a designated forwarder in an event. In a converged state, if PE node 112 has been elected as the designated forwarder for a particular VLAN, PE node 112 can be in a VLAN_DF state (state 160). Otherwise, PE node 112 can be in a VLAN_SB state (state 162), indicating a standby state for the VLAN. In the example in FIG. 1A, upon initiation and convergence, PE node 112 can be in a VLAN_DF state for VLAN 102 and in a VLAN_SB state for VLAN 104.

If PE node 112 detects an event (operation 172), state machine 150 transitions from the VLAN_DF or VLAN_SB state to the EV_DECT state (state 164), which indicates that PE node 112 has detected an event. PE node 112 sends a route update to a respective partner PE node (e.g., PE node 114) (operation 174), which causes state machine 150 to transition from the EV_DECT state to the WAIT_ACK state (state 166). If PE node 112 receives an acknowledgment (e.g., a route update comprising the indicator) (operation 176), unless all acknowledgments are not received, state machine 150 remains in the WAIT_ACK state.

On the other hand, if PE node 112 receives all acknowledgments (operation 178), state machine 150 transitions from the WAIT_ACK state to a DF_ELECT state (state 168), which indicates that PE node 112 has initiated the election process for the designated forwarder. If PE node 112 becomes elected as the designated forwarder (e.g., for VLAN 102 in FIG. 1A), state machine 150 transitions from the DF_ELECT state to the VLAN_DF state. On the other hand, if PE node 112 becomes elected as the standby PE node (e.g., for VLAN 104 in FIG. 1A), state machine 150 transitions from the DF_ELECT state to the VLAN_SB state.

Designated Forwarder Election

Figure 2A:
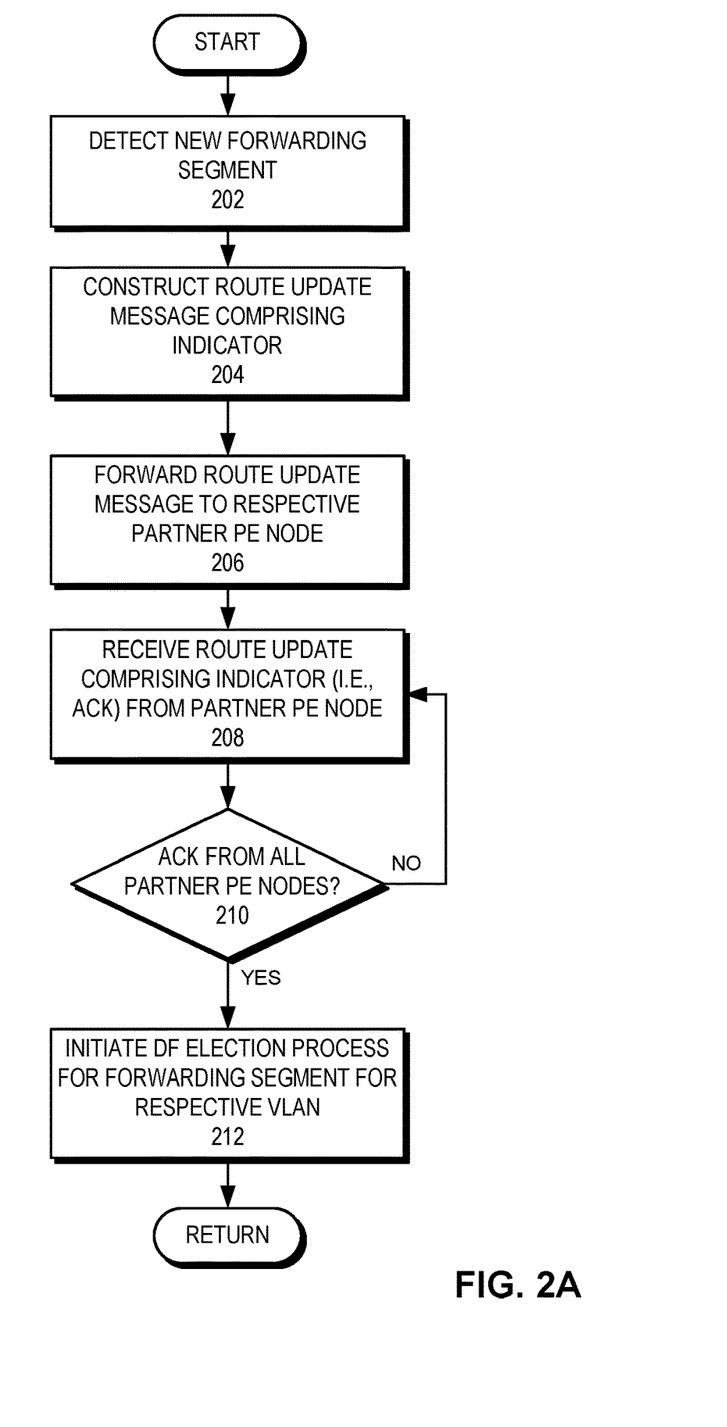
FIG. 2A presents a flowchart illustrating the process of a PE node selecting a designated forwarder (DF) for forwarding multi-destination traffic to a CE node, in accordance with an embodiment of the present invention.

FIG. 2A presents a flowchart illustrating the process of a PE node selecting a designated forwarder for forwarding multi-destination traffic to a CE node, in accordance with an embodiment of the present invention. During operation, the PE node detects a new forwarding segment (operation 202) and constructs a route update message comprising the indicator (operation 204). This route update message can include one or more route updates associated with a forwarding segment. Such a route update can be a VPN auto discovery or an Ethernet segment route update. The PE node then forwards the route update message to a respective partner PE node (operation 206). Forwarding a message can include determining an egress port corresponding to the destination address of the message and transmitting via the egress port.

The PE node then receives a route update message comprising the indicator, which can indicate an acknowledgment, from a partner PE node (operation 208) and checks whether the PE node has received an acknowledgment from all partner PE nodes (operation 210). Receiving an acknowledgment from all partner PE nodes indicates that the corresponding route updates have been received and processed by all partner PE nodes. Therefore, the local PE node can initiate the designated forwarder election process while mitigating the possibility of packet duplication. The PE node then initiates the designated forwarder election process for the forwarding segment for a respective VLAN (operation 212). If the PE node has not received an acknowledgment from all partner PE nodes, the PE node continues to receive a route update message comprising the indicator from a partner switch (operation 208).

Figure 2B:
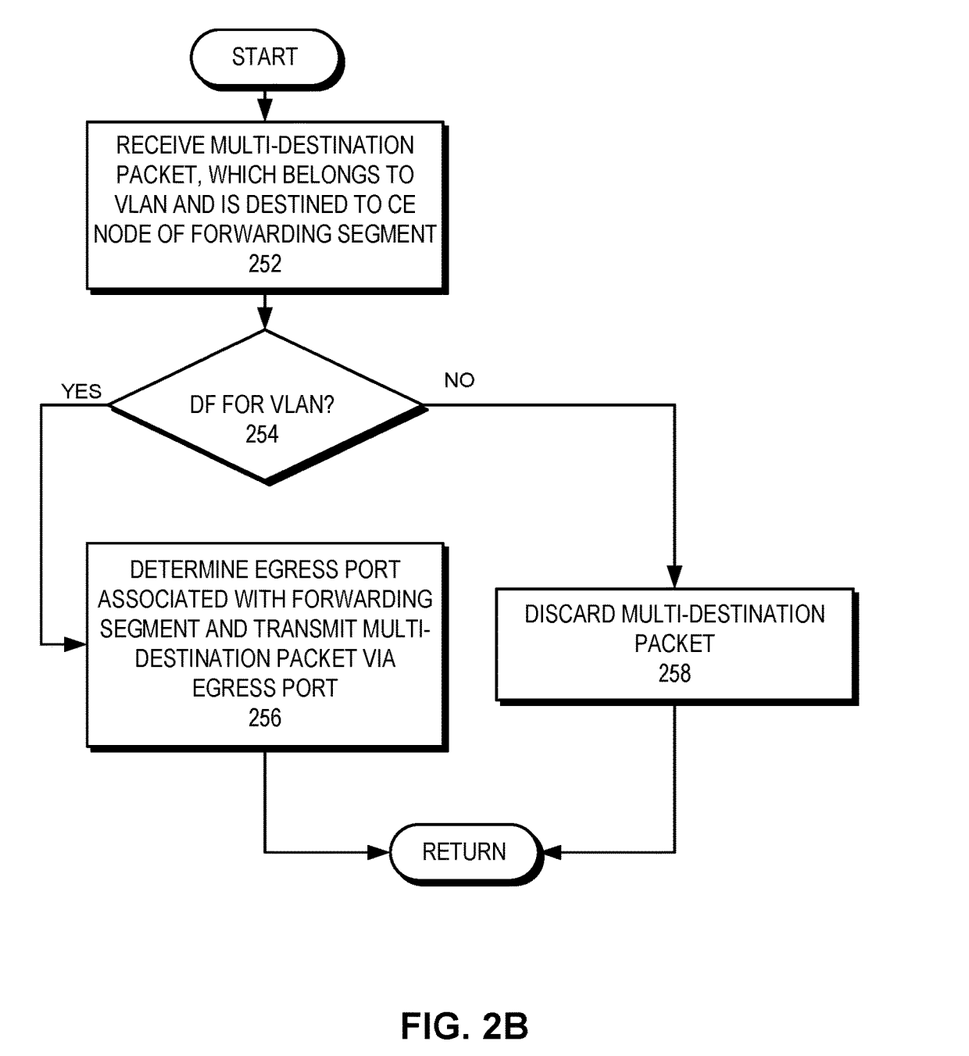
FIG. 2B presents a flowchart illustrating the process of a PE node forwarding multi-destination traffic to a CE node, in accordance with an embodiment of the present invention.

FIG. 2B presents a flowchart illustrating the process of a PE node forwarding multi-destination traffic to a CE node, in accordance with an embodiment of the present invention. During operation, the PE node receives a multi-destination packet, which belongs to a VLAN and is destined to a CE node of a forwarding segment (operation 252). The forwarding segment can be a VPN Ethernet segment via which the CE node is multi-homed. The PE node checks whether the PE node is the designated forwarder for the VLAN (operation 254). If the PE node is the designated forwarder for the VLAN, the PE node determines an egress port associated with the forwarding segment and transmits the multi-destination packet via the egress port (operation 256). On the other hand, if the PE node is not the designated forwarder for the VLAN, the PE node discards the multi-destination packet (operation 258).

Event Handling

Figure 3A:
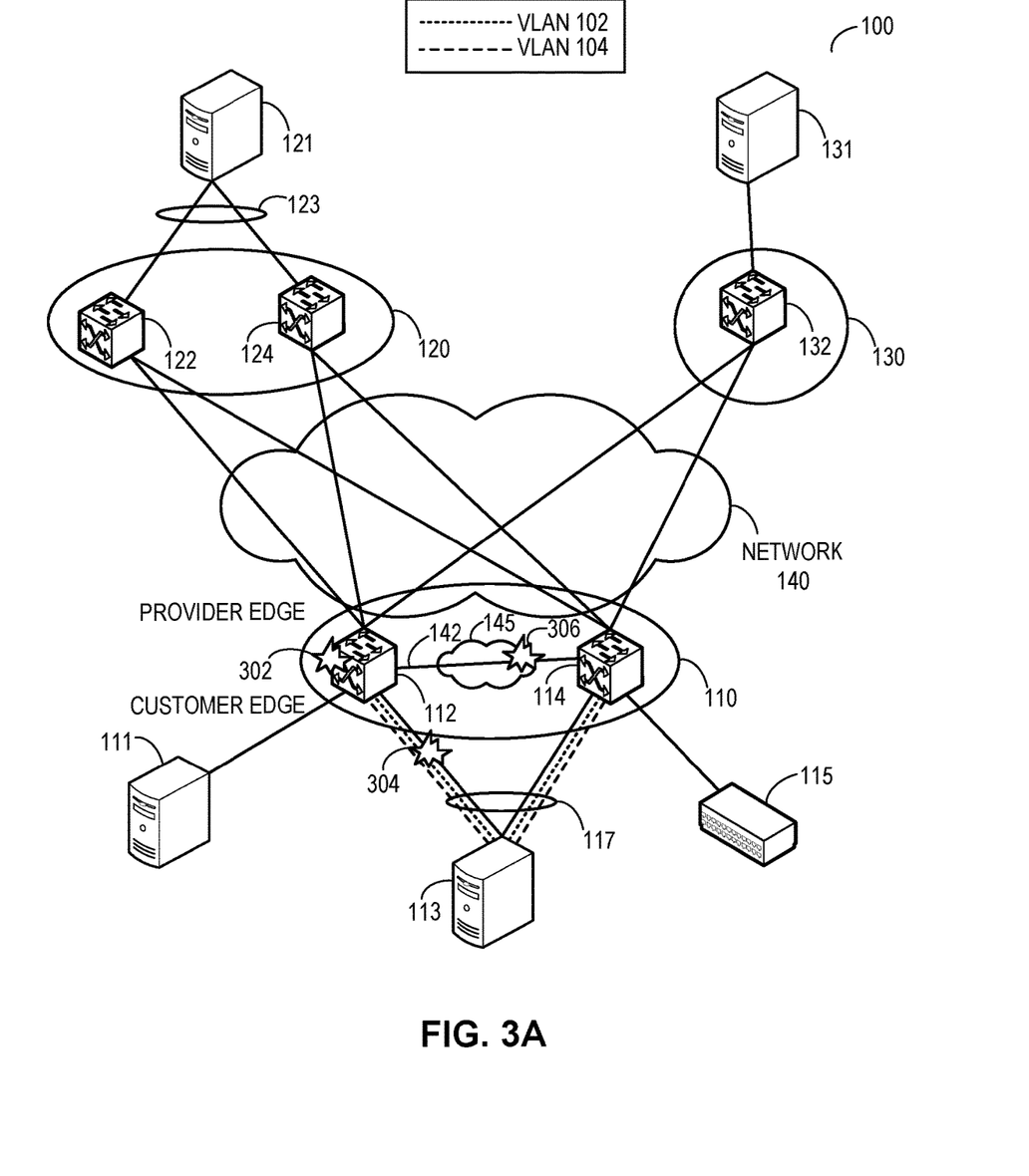
FIG. 3A illustrates exemplary event-handling associated with forwarding of multi-destination traffic to a multi-homed CE node in a virtual private network, in accordance with an embodiment of the present invention.

A PE node can encounter an event, such as a failure, that can render the PE node or its service unavailable. As described in conjunction with FIG. 1A, PE nodes 112 and 114 can be elected as the designated forwarders for VLANs 102 and 104, respectively. Suppose that event 302 causes PE node 112 to fail and partner PE node 114 detects the failure. In some embodiments, partner PE nodes 112 and 114 exchange periodic control messages via links 142 to notify each other regarding their respective operational states. If PE node 114 does not receive any control message from PE node 112 for a period of time, PE node 114 detects a failure in PE node 112.

Suppose that event 304 causes failure of the link between PE node 112 and CE node 113. PE node 112 can detect the failure and notify partner PE node 114 regarding the failure using a control message. This control message can be an error notification message encapsulated in an encapsulation header corresponding to logical connection 145. The destination address of the encapsulation header can correspond to PE node 114. It should be noted that PE node 112 can notify each of the partner PE nodes regarding the failure. PE node 114 receives the control message, decapsulates the encapsulation header, and obtains the error notification message. PE node 114 thus becomes notified regarding event 304.

Upon detecting the failure associated with events 302 and/or 304, PE node 114 can determine that PE node 112 can no longer operate as the designated forwarder for VLAN 102. PE node 114 then initiates a designated forwarder election process. Since PE node 114 is the only partner PE node available for forwarding segment 117, PE node 114 becomes elected as the designated forwarder for VLAN 102 as well. As a result, PE node 114 forwards multi-destination traffic belonging to both VLANs 102 and 104 to CE node 113. If PE node 112 recovers from the failure associated with events 302 and/or 304, PE node 112 can send a route update message comprising an indicator to PE node 114.

PE node 112 then waits for an acknowledgment before initiating a designated forwarder election. Upon receiving the route update message, PE node 114 obtains the indicator from the route update message. In this way, PE node 114 determines that PE node 114 should include the indicator in its route update message. PE node 114 thus sends a route update message comprising the indicator to PE node 112. Upon receiving the acknowledgment, PE node 112 initiates the designated forwarder election process for VLANs 102 and 104. PE node 112 independently elects PE nodes 112 and 114 as the designated forwarders for VLANs 102 and 104, respectively. In some embodiments, upon receiving the route update message, PE node 114 can, optionally, wait for a predetermined period of time and initiates the election process. PE node 114 then elects PE nodes 112 and 114 as the designated forwarders for VLANs 102 and 104, respectively.

Suppose that event 306 causes failure of the connection between PE nodes 112 and 114. Since PE nodes 112 and 114 both use logical connection 145, forwarding segment 117 may still remain operational as long as PE nodes 112 and 114 can communicate and synchronize with each other. Otherwise, in some embodiments, if the links coupling CE node 113 to PE nodes 112 and 114 remain active, PE nodes 112 and 114 initiate a master-slave selection process for the forwarding segment 117. In a master-slave mode of operation, the master node actively forwards traffic while the slave nodes remain inactive.

Figure 3B:
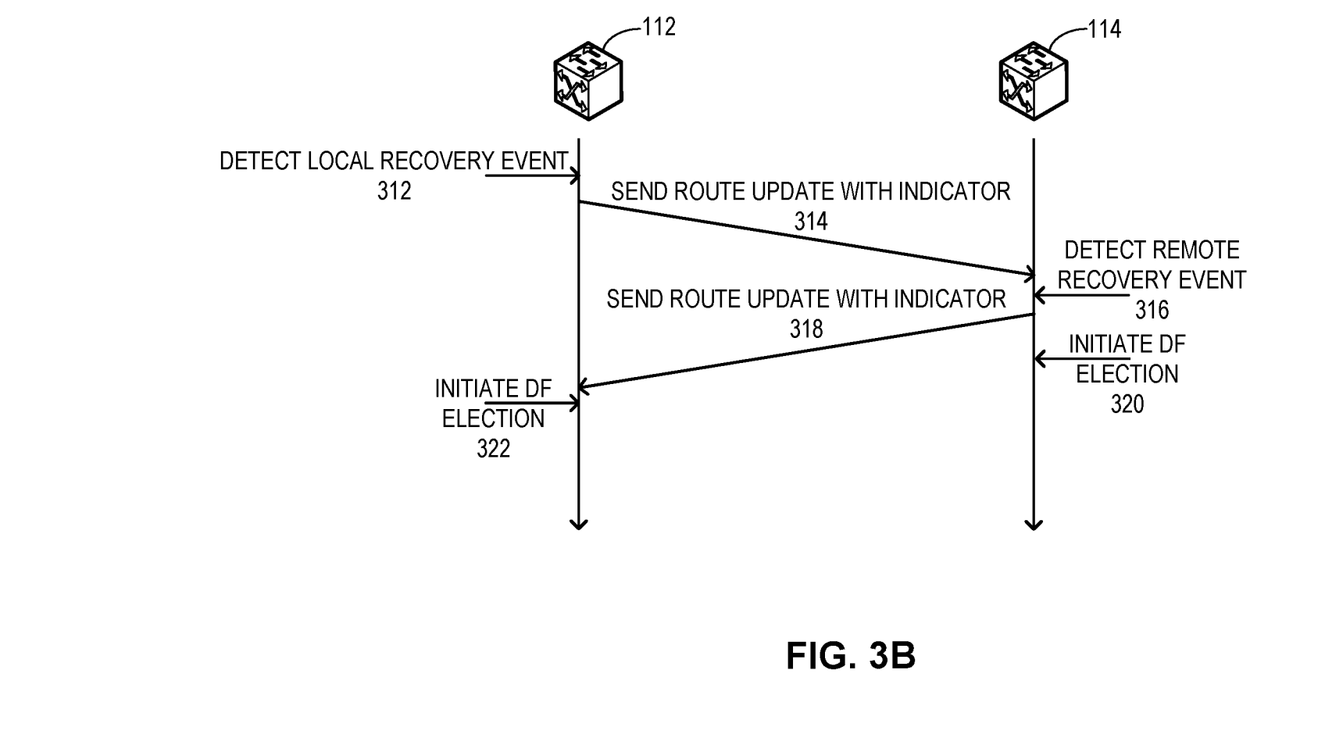
FIG. 3B illustrates an exemplary communication diagram of event-handling associated with forwarding of multi-destination traffic to a multi-homed CE node in a virtual private network, in accordance with an embodiment of the present invention.

FIG. 3B illustrates an exemplary communication diagram of event-handling associated with forwarding of multi-destination traffic to a multi-homed CE node in a virtual private network, in accordance with an embodiment of the present invention. During operation, PE node 112 detects a local recovery event (operation 312), as described in conjunction with FIG. 3A. PE node 112 sends a route update message comprising the indicator to PE node 114 (operation 314). PE node 114 detects the corresponding remote recovery event based on the route update message (operation 316). For example, upon discovering the indicator in the received route update message, PE node 114 can determine that it should include the indicator in its route update message. In response, PE node 114 sends a route update message comprising the indicator to PE node 112 (operation 318).

This message comprising the indicator can represent an acknowledgment from PE node 114. PE node 112 receives the route update message comprising the indicator and determines that PE node 114 has received its route update message. PE node 112 then initiates the designated forwarder election process (operation 322). On the other hand, upon receiving the route update message sent from PE node 112 (operation 314), PE node 114 initiates the designated forwarder election process (operation 320). PE nodes 112 and 114 then elect PE nodes 112 and 114 as the designated forwarders for VLANs 102 and 104, respectively.

Recovery Operations

Figure 4A:
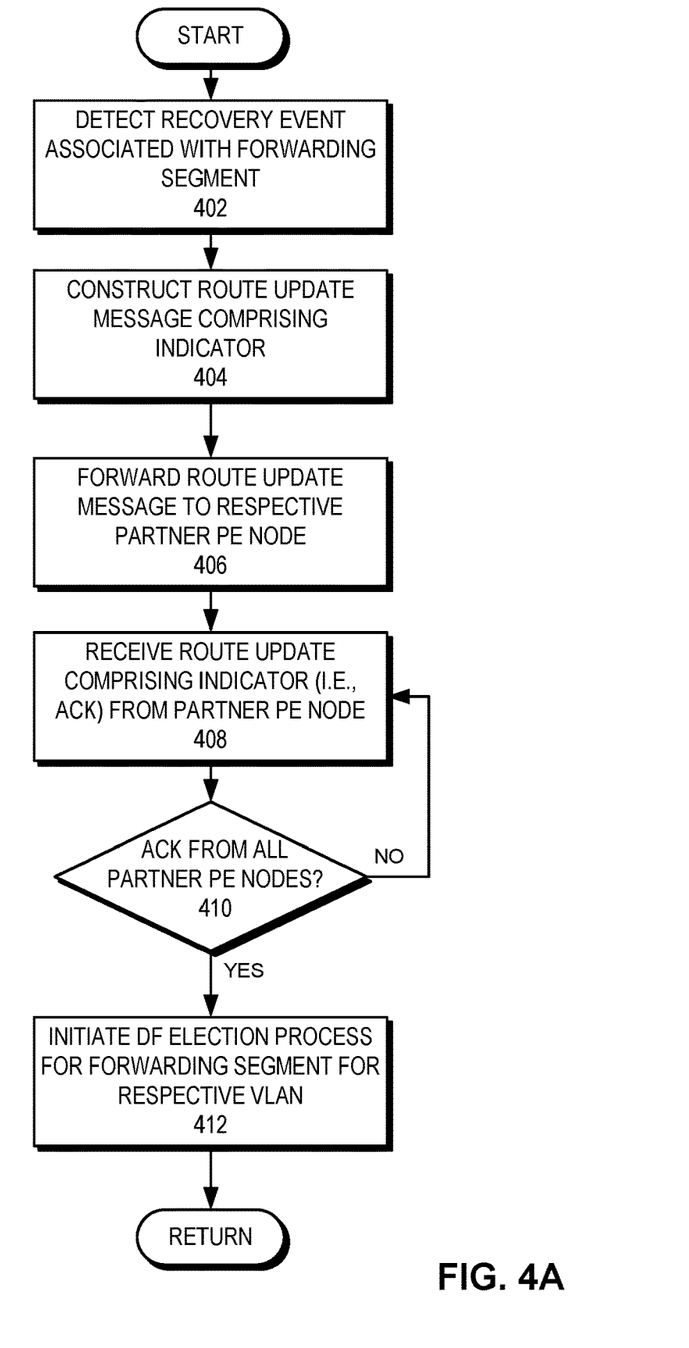
FIG. 4A presents a flowchart illustrating the process of a PE node selecting a designated forwarder for forwarding multi-destination traffic to a CE node during an event, in accordance with an embodiment of the present invention.

FIG. 4A presents a flowchart illustrating the process of a PE node selecting a designated forwarder for forwarding multi-destination traffic to a CE node during an event, in accordance with an embodiment of the present invention. During operation, the PE node detects a recovery event associated with a forwarding segment (operation 402) and constructs a route update message comprising the indicator (operation 404). This route update message can include one or more route updates associated with a forwarding segment. Such a route update can be a VPN auto discovery or an Ethernet segment route update. The PE node then forwards the route update message to a respective partner PE node (operation 406). Forwarding a message can include determining an egress port corresponding to the destination address of the message and transmitting via the egress port.

The PE node then receives a route update message comprising the indicator, which can indicate an acknowledgment, from a partner PE node (operation 408) and checks whether the PE node has received an acknowledgment from all partner PE nodes (operation 410). Receiving an acknowledgment from all partner PE nodes indicates that the corresponding route updates have been received and processed by all partner PE nodes. Therefore, the local PE node can initiate the designated forwarder election process while mitigating the possibility of packet duplication. The PE node then initiates the designated forwarder election process for the forwarding segment for a respective VLAN (operation 412). In other words, during the recovery event, the designated forwarder election process is initiated for all VLANs associated with the forwarding segment. If the PE node has not received an acknowledgment from all partner PE nodes, the PE node continues to receive a route update message comprising the indicator from a partner switch (operation 408).

Figure 4B:
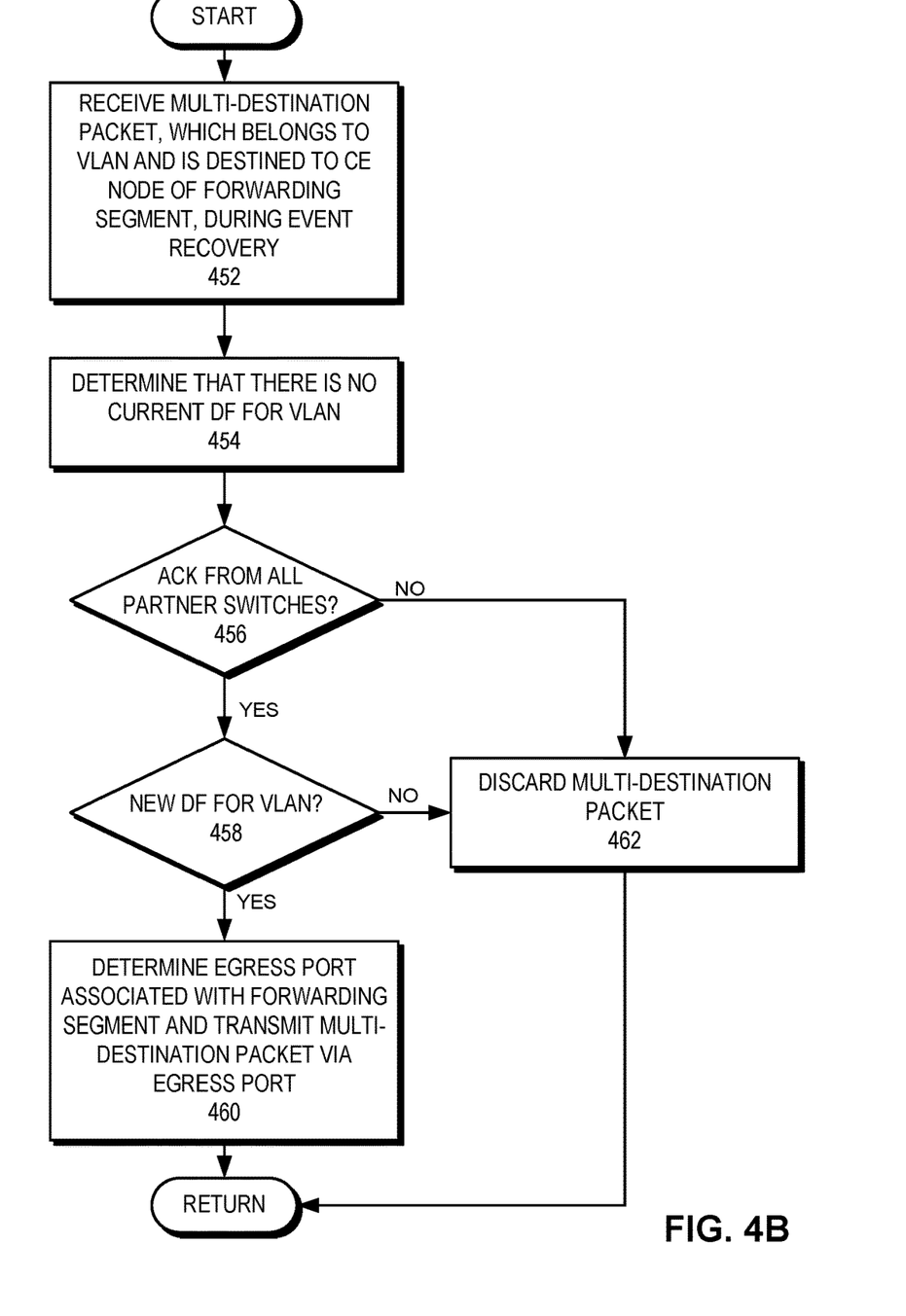
FIG. 4B presents a flowchart illustrating the process of a PE node forwarding multi-destination traffic to a CE node during an event, in accordance with an embodiment of the present invention.

FIG. 4B presents a flowchart illustrating the process of a PE node forwarding multi-destination traffic to a CE node during an event, in accordance with an embodiment of the present invention. During operation, the PE node receives a multi-destination packet, which belongs to a VLAN and destined to a CE node of a forwarding segment, during an event recovery (operation 452). The forwarding segment can be a VPN Ethernet segment via which the CE node is multi-homed. It should be noted that during an event that triggers the designated forwarder election process, a VLAN does not have a designated forwarder. Hence, the PE node determines that there is no current designated forwarder for the VLAN (operation 454). The PE node then checks whether the PE node has received an acknowledgment from all partner PE nodes (operation 456).

If the PE node has received an acknowledgment from all partner PE nodes, the PE node checks whether the PE node is the new designated forwarder for the VLAN (operation 458). If the PE node has not received an acknowledgment from all partner PE nodes (operation 456) or the PE node is not the new designated forwarder for the VLAN (operation 458), the PE node discards the multi-destination packet (operation 462). On the other hand, if the PE node is the new designated forwarder for the VLAN (operation 458), the PE node determines an egress port associated with the forwarding segment and transmits the multi-destination packet via the egress port (operation 460).

Exemplary Switch System

Figure 5:
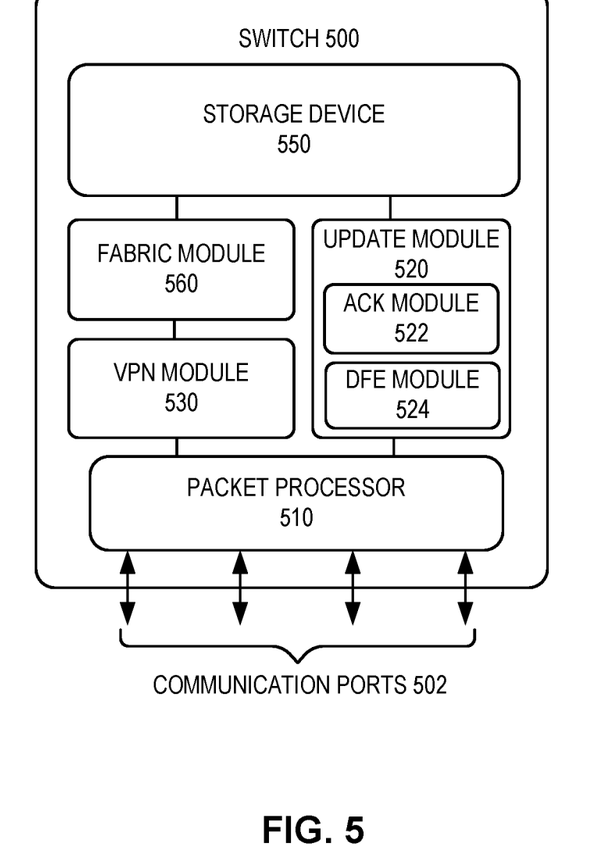
FIG. 5 illustrates an exemplary architecture of a switch operating as a PE node facilitating efficient forwarding of multi-destination traffic to a multi-homed CE node, in accordance with an embodiment of the present invention.

FIG. 5 illustrates an exemplary architecture of a switch operating as a PE node facilitating efficient forwarding of multi-destination traffic to a multi-homed CE node, in accordance with an embodiment of the present invention. In this example, a switch 500 includes a number of communication ports 502, a packet processor 510, a VPN module 530, and a storage device 550. In some embodiments, switch 500 further includes an update module 520, an acknowledgment module 522, and a designated forwarder election (DFE) module 524. At least one of the communication ports 502 participates in a forwarding segment. Packet processor 510 extracts and processes header information from the received packets via communication ports 502.

In some embodiments, switch 500 may maintain a membership in a fabric switch, which can be a network of interconnected switches, wherein switch 500 also includes a fabric module 560. Fabric module 560 maintains a configuration database in storage device 550 that maintains the configuration state of every switch within the fabric switch. Fabric module 560 maintains the state of the fabric switch, which is used to join other switches. In some embodiments, switch 500 can be configured to operate in conjunction with a remote switch as an Ethernet switch.

Communication ports 502 can include inter-switch communication channels for communication within the fabric switch. These inter-switch communication channels can be implemented via a regular communication port and based on any open or proprietary format. Communication ports 502 can also include one or more extension communication ports for communication between neighbor fabric switches. Communication ports 502 can include one or more TRILL ports capable of receiving frames encapsulated in a TRILL header. Communication ports 502 can also include one or more IP ports capable of receiving IP packets. An IP port is capable of receiving an IP packet and can be configured with an IP address. Packet processor 510 can process TRILL-encapsulated frames and/or IP packets (e.g., encapsulated packets based on a tunneling protocol). Examples of a tunneling protocol include, but are not limited to, virtual extensible LAN (VXLAN), generic routing encapsulation (GRE), network virtualization using GRE (NVGRE), layer-2 tunneling protocol (L2TP), and multi-protocol label switching (MPLS).

VPN module 530 allows switch 500 to participate in a virtual network as a PE node. VPN module 530 establishes a forwarding segment for a multi-homed CE node (e.g., via one or more of communication ports 502). In response to a failover associated with switch 500, update module 520 sends a route update comprising the indicator to a partner PE node. Acknowledgment module 522 waits for a response from the partner PE node. Upon receiving a route update comprising the indicator, acknowledgment module 522 determines the route update as the acknowledgment for the route update. Upon receiving an acknowledgment from all partner PE nodes, designated forwarder election module 524 initiates and executes the designated forwarder election process.

In response to a remote failure, upon detecting the failure, designated forwarder election module 524 initiates and executes the designated forwarder election process. In response to a corresponding remote failover, update module 520 receives a route update comprising the indicator from a partner PE node. Acknowledgment module 522 includes the indicator in a route update message as an acknowledgment. Update module 520 then sends the route update comprising the indicator to the partner PE node. In some embodiments, designated forwarder election module 524 waits for a predetermined period of time and initiates and executes the designated forwarder election process.

Note that the above-mentioned modules can be implemented in hardware as well as in software. In one embodiment, these modules can be embodied in computer-executable instructions stored in a memory which is coupled to one or more processors in switch 500. When executed, these instructions cause the processor(s) to perform the aforementioned functions.

In summary, embodiments of the present invention provide a switch and a method for load balancing of logical connections over a multi-chassis trunk. In one embodiment, the switch includes a link aggregation database and a packet processor. The link aggregation database stores configuration information regarding a plurality of switches participating in a multi-chassis trunk. The plurality of switches includes the switch. The packet processor constructs a packet for a remote switch. This packet is forwardable via a logical connection. The packet includes a virtual circuit label associated with a second logical connection of a second switch. The plurality of switches includes the second switch as well.

The methods and processes described herein can be embodied as code and/or data, which can be stored in a non-transitory computer-readable storage medium. When a computer system reads and executes the code and/or data stored on the non-transitory computer-readable storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   network-virtualization circuitry configured to establish a forwarding segment for an end device, wherein the end device is multi-homed with the switch and a second switch participating in the forwarding segment, and wherein the forwarding segment is identified by a segment identifier persistent in the switch and the second switch;
   update circuitry configured to construct, for the second switch, a first route update message comprising an indicator value for the forwarding segment;
   acknowledgment circuitry configured to determine the indictor value in a second route update message from the second switch as an acknowledgment for the first route update message; and
   election circuitry configured to, in response to determining the acknowledgment from a respective switch participating in the forwarding segment, initiate a designated forwarder election for the forwarding segment, wherein the designated forwarder is responsible for forwarding multi-destination traffic in the forwarding segment, wherein
   the election circuitry initiates the designated forwarder election for the forwarding segment as a result of a new forwarding segment being deployed or an occurrence of a recovery event of the switch or second switch, and the end device transmits data on the forwarding segment after the designated forwarder election is completed.

2. The switch of claim 1, wherein the forwarding segment is an Ethernet segment of a virtual private network (VPN).

3. The switch of claim 2, wherein the switch and the second switch are provider edge (PE) nodes, and the end device is a customer edge (CE) node in the VPN.

4. The switch of claim 1, wherein the indicator value is a value encoded in a transitive Extended Community field of the first and second route update messages.

5. The switch of claim 1, wherein the election circuitry is further configured to elect the designated forwarder for a respective virtual local area network (VLAN) independently from the second switch.

6. The switch of claim 1, wherein the election circuitry is further configured to, in response to detecting a failure associated with the second switch, elect the switch as the designated forwarder for a first VLAN for which the second switch has been elected as the designated forwarder prior to the failure.

7. The switch of claim 6, wherein the acknowledgment circuitry is further configured to determine the indictor value in a third route update message from the second switch indicating a recovery from the failure; and
   wherein the election circuitry is further configured to elect the second switch as the designated forwarder for the first VLAN.

8. The switch of claim 1, wherein the election circuitry is further configured to wait for a predetermined period of time prior to initiating the designated forwarder election for the forwarding segment.

9. The switch of claim 1, wherein the update circuitry is configured to construct the first route update message in response to one of:
- initialization of the forwarding segment for the end device; and
- a recovery from a failure of the switch associated with the forwarding segment for the end device.

10. The switch of claim 1, wherein the election circuitry has elected the switch as the designated forwarder for a second VLAN; and
- wherein the switch further comprises a packet processor configured to discard a multi-destination packet belonging to the VLAN.

11. A computer-implemented method, comprising:
- establishing a forwarding segment for an end device, wherein the end device is multi-homed with a switch and a second switch participating in the forwarding segment, and wherein the forwarding segment is identified by a segment identifier persistent in the switch and the second switch;
- constructing, for the second switch, a first route update message comprising an indicator value for the forwarding segment;
- determining the indictor value in a second route update message from the second switch as an acknowledgment for the first route update message; and
- in response to determining the acknowledgment from a respective switch participating in the forwarding segment, initiating a designated forwarder election for the forwarding segment, wherein the designated forwarder is responsible for forwarding multi-destination traffic in the forwarding segment, wherein
- the initiating includes initiating the designated forwarder election for the forwarding segment as a result of a new forwarding segment being deployed or an occurrence of a recovery event of the switch or second switch, and the end device transmits data on the forwarding segment after the designated forwarder election is completed.

12. The method of claim 11, wherein the forwarding segment is an Ethernet segment of a virtual private network (VPN).

13. The method of claim 12, wherein the switch and the second switch are provider edge (PE) nodes, and the end device is a customer edge (CE) node in the VPN.

14. The method of claim 11, wherein the indicator value is a value encoded in a transitive Extended Community field of the first and second route update messages.

15. The method of claim 11, further comprising electing the designated forwarder for a respective virtual local area network (VLAN) independently from the second switch.

16. The method of claim 11, further comprising, in response to detecting a failure associated with the second switch, electing the switch as the designated forwarder for a first VLAN for which the second switch has been elected as the designated forwarder prior to the failure.

17. The method of claim 16, further comprising:
- determining the indictor value in a third route update message from the second switch indicating a recovery from the failure; and
- electing the second switch as the designated forwarder for the first VLAN.

18. The method of claim 11, further comprising waiting for a predetermined period of time prior to initiating the designated forwarder election for the forwarding segment.

19. The method of claim 11, further comprising constructing the first route update message in response to one of:
- initialization of the forwarding segment for the end device; and
- a recovery from a failure of the switch associated with the forwarding segment for the end device.

20. The method of claim 11, wherein the switch has been elected as the designated forwarder for a second VLAN; and
- wherein the method further comprises discarding a multi-destination packet belonging to the VLAN.

* * * * *